Nov. 26, 1957 F. R. HOUSE 2,814,676

TAPE-STEPPING DEVICE FOR HIGH-SPEED MAGNETIC RECORDING

Filed Sept. 23, 1954 3 Sheets-Sheet 1

Frank Rudolph House
Inventor
by James R. Hodder
Attorney

Frank Rudolph House
Inventor
by James R. Hodder
Attorney

CURRENT IMPULSES REQUIRED FOR FEEDING ONE INCREMENT OF TAPE THROUGH SYSTEM

Frank Rudolph House
Inventor
by James R. Hodder
Attorney

United States Patent Office 2,814,676

Patented Nov. 26, 1957

2,814,676

TAPE-STEPPING DEVICE FOR HIGH-SPEED MAGNETIC RECORDING

Frank Rudolph House, Franklin, Mass., assignor to Anderson-Nichols & Company, Boston, Mass., a firm Application September 23, 1954, Serial No. 457,846

16 Claims. (Cl. 179—100.2)

This invention relates to recording systems using magnetic recording tape and the like, and relates more particularly to such systems in which the information to be recorded occurs at irregular intervals.

Ordinary magnetic tape-recording systems involve the passage of the tapes past the magnetic recording heads at speeds commensurate with the maximum frequency of the signals to be recorded. When such signals are received in a continuous train, the magnetic tape is used efficiently in that there is no appreciable length of tape upon which a signal is not recorded. There are, however, applications for magnetic tape-recording where the information to be recorded occurs at irregular or random intervals. Such signals cannot be anticipated as to time of occurrence since they may be emitted by data-handling or communication equipment, the output of which is subject to the will of a human operator, or to more or less random occurrence of the condition which actuates the transmitting equipment. If the usual tape-recording methods are used to record signals of this type, there may result long intervals of tape upon which no signal is recorded, with consequent waste of tape. Furthermore, when such a tape-recording is used in a play-back device, a great deal of time is lost in playing back due to the blank spaces on the tape.

This invention provides a tape-recording system in which each incoming signal to be recorded steps the feeder of the system once and is simultaneously recorded on the tape. Thus, incoming signals of random frequency are recorded in evenly spaced steps, and all of the tape is utilized.

Play-back of the recorded tape is economical of time because of the absence of blank tape sections which would be encountered in continuous feed recordings of random messages.

In one embodiment of this invention, which is capable of feeding tape in evenly spaced increments at sustained or intermittent rates at from 0 to more than 500 steps per second, the tape-feeding device includes three basic elements: an in-brake, a dimpler, and an out-brake. These are operated under control of the signal to be recorded, to alternately flex and straighten the tape in such a manner that the tape is pulled from one end during flexure, and drawn from the other end during straightening.

A feature of this invention is that the recording tape is normally stationary; its movement is started by an incoming signal, following which it proceeds thru a cycle of operations including the recording on the tape, and then stops until the next signal arrives.

Another feature of this invention is that a tape supply and take-up mechanism is provided which keeps the tape taut at both ends of the feeder while maintaining a slight net tension on the tape in the feed direction.

Another feature of this invention is that the tape supply and take-up mechanism automatically compensates for changes in feed rate so as to always maintain proper tape tension.

Another feature of this invention is that means is provided for decoupling the tape-feeding device from the inertias of the tape supply and take-up assemblies so that the response of the feeder proper to incoming signals is sufficiently fast.

An object of this invention is to conserve space on a tape on which random signals are recorded.

This invention will now be described with reference to the annexed drawings, of which:

Figure 1:
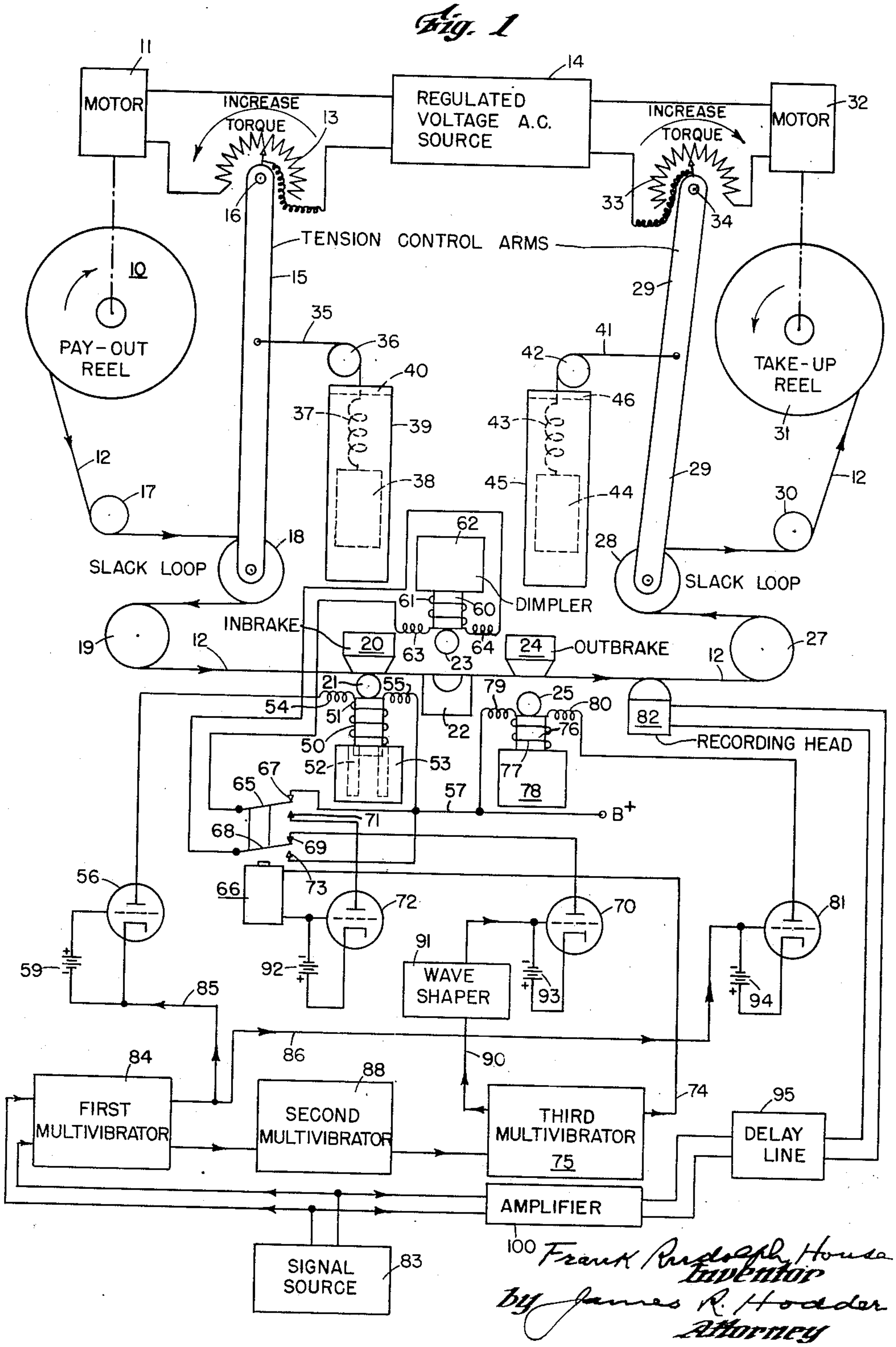
Fig. 1 is a diagrammatic view of one embodiment of this invention.

Referring now to Fig. 1 of the drawings, a tape pay-out reel 10 is connected to a conventional hysteresis type electric motor 11 which includes built-in speed-reducing gearing, and which is continuously operated in a stalled condition to exert a small clockwise torque on the reel 10, and, therefore, a slight reverse tension on the tape 12 from the reel. The motor 11 is connected in series with the rheostat 13 to the regulated A. C. voltage source 14. The slider of the rheostat is attached to the upper end of the control arm 15 which is rotatably supported at 16 from the rheostat assembly.

The tape 12 as it is paid out from the reel 10 passes over the idler roll 17, the roll 18 which is rotatably attached to the lower end of the arm 15, the roll 19, then between the anvil 20 and the cylindrical bar 21 of the in-brake, then between the anvil 22 and the cylindrical bar 23 of the dimpler, then between the anvil 24 and the cylindrical bar 25 of the out-brake, then over the recording head 82, then over the idler roll 27, the roll 28 which is rotatably attached to the lower end of the control arm 29, then over the idler roll 30, and finally is wound up on the take-up reel 31.

The take-up reel 31 is connected to a conventional hysteresis type electric motor 32 which has built-in speed-reducing gearing similar to the motor 11, and which is connected in series with the rheostat 33 to the A. C. source 14. The slider of the rheostat 33 is attached to the upper end of the control arm 29 which is rotatably supported at 34 to the assembly of the rheostat 33. The motor 32 rotates the reel 31 in a direction to wind the tape 12 thereon.

The control arm 15 has attached thereto between its upper and lower ends one end of the cable 35 which passes over the idler pulley 36, and which is connected at its other end to the upper end of the coiled spring 37, to the lower end of which the weight 38 is attached. The spring and weight are within a container 39 which is filled with a damping liquid 40 which may be water or any other suitable liquid for damping the movement of the weight 38.

The control arm 29 has attached thereto between its upper and lower ends one end of the cable 41, which passes over the idler pulley 42 and is connected at its other end to the upper end of the coiled spring 43, to the lower end of which the weight 44 is attached. The spring 43 and the weight 44 are within the container 45 which is filled with a damping liquid 46 similar to the liquid 40 within the container 39.

The bar 21 of the in-brake is attached to the top of the cylindrical tube 50 which has the winding 51 thereon. The tube 50 extends within an annular air gap 52 of the permanent magnet 53, this construction being similar to that of a conventional dynamic loud speaker, the tube 50 and its winding 51 corresponding to the voice coil of such a speaker, and may have a restoring means, which is not shown, for returning the in-brake to its mid-position although this is not essential. The ends of the winding 51 have the flexible leads 54 and 55 connected thereto.

The lead 54 is connected to the plate of the triode 56. The lead 55 is connected to the bus 57 which is connected to B+, the positive terminal of a conventional plate voltage supply source which is not illustrated. An electromagnetic unit having a field winding can be used instead of the permanent magnet one.

The control grid of the triode 56 is connected to the positive terminal of the bias battery 59, the negative terminal of which is connected to the cathode of the triode. The grid of the triode is normally biased positively so that the triode normally conducts and supplies plate current thru the winding 51 on the coil 50 of the in-brake, causing the bar 21 to press the tape 12 against the anvil 20 so that the tape is held against movement.

The dimpler bar 23 is attached to the lower end of the cylindrical tube 60 which has a winding 61 thereon, the tube 60 being movable within an annular air gap of the permanent magnet 62 similar to that of the in-brake, this construction also being similar to that of a dynamic loud speaker. For reversing the direction of current flowing thru the winding 61, a reversal device shown symbolically as a relay 66 is provided. The ends of the winding 61 are connected to the flexible leads 63 and 64. The lead 63 is connected to the armature 65 of the relay 66, which armature is in contact with the relay contact 67 when the relay is de-energized. The contact 67 is connected to B+.

The lead 64 is connected to the relay armature 68 which is in contact with the relay contact 69 when the relay is de-energized. The contact 69 is connected to the plate of the triode 70. When the relay is energized, its armature 65 touches the relay contact 71 which is connected to the plate of the triode 72, and its armature 68 touches the relay contact 73 which is connected to B+. The energizing winding of the relay 66 is connected in series with the output lead 74 of the multivibrator 75 and the control grid of the triode 72.

The relay 66 and its armatures and contacts act as a double-pole, double-throw switch, connecting one end of the winding 61 of the dimpler to the plate of the tube 72, and the other end of the winding 61 to B+ when the relay is de-energized, and connecting the other end of the winding 61 to the plate of the tube 70, and the one end of the winding 61 to B+ when the relay is energized. The polarity of the current flowing thru the winding 61 is thus reversed when the relay is energized. Relays capable of high speed operation are manufactured by Stevens-Arnold Inc. of Boston, Mass., and may be used.

The bar 25 of the out-brake is attached to the upper end of the cylindrical tube 76 which has a winding 77 thereon, and which is movable in an annular air gap within the magnet 78, this construction being similar to that of a dynamic loud speaker as in the cases of the in-brake and dimpler. The flexible leads 79 and 80 are connected to the ends of the winding 77. The lead 79 is connected to B+, and the lead 80 is connected to the plate of the triode 81.

The recording head 82 is connected thru the delay line 95 and the amplifier 100 to the signal source 83, which is also connected to the input of the first multivibrator 84. One output of the multivibrator 84 is connected thru output lead 85 to the cathode of the triode 56, and thru the output lead 86 to the control grid of the triode 81. The other output of the multivibrator 84 is connected to the input of the second multivibrator 88. The output of the second multivibrator 88 is connected to the input of the third multivibrator 75. The latter supplies a first output pulse thru the previously described output lead 74 to the relay 66 and the control grid of the triode 72. It supplies a second output pulse thru the output lead 90 in series with the wave-shaper 91 to the control grid of the triode 70. The delay line 95 is a conventional one, such as is disclosed on page 150 of "Principles of Radar," third edition, published by McGraw-Hill. For certain types of signals the delay line may not be required.

Figures 3, 3A, 3B, 3C, 3D:
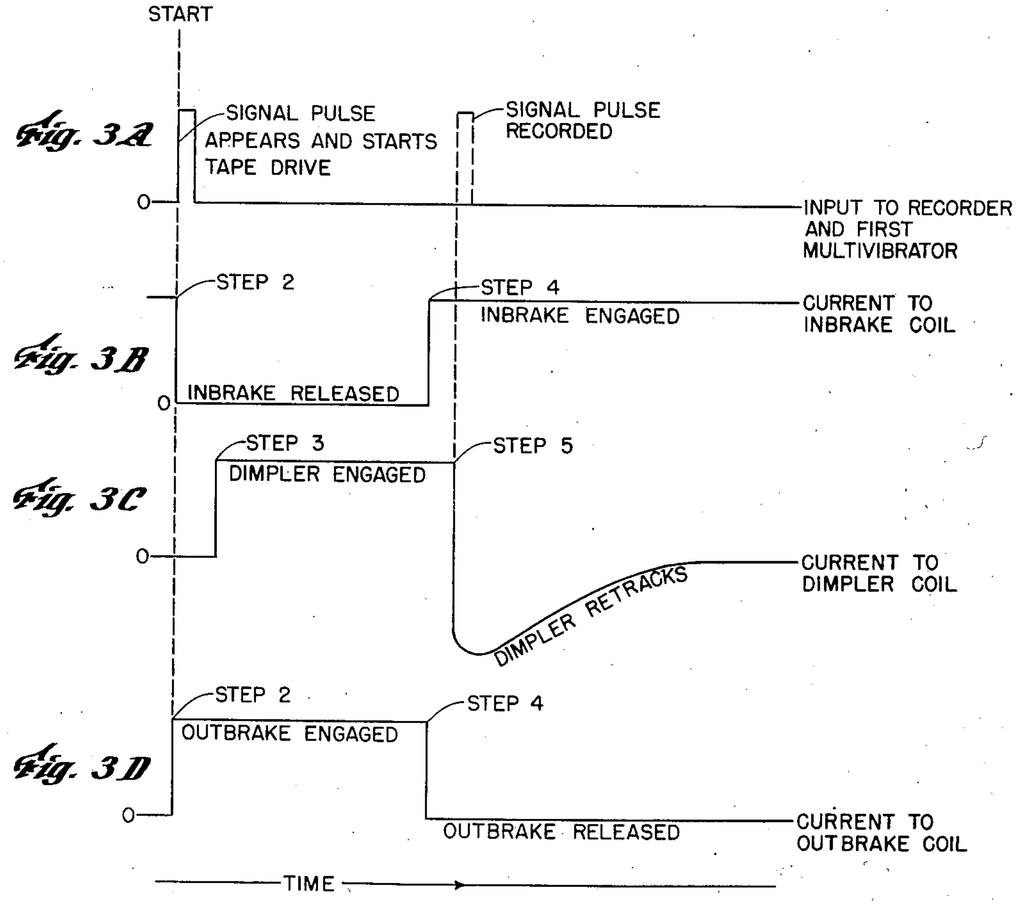
Fig. 3 is a chart showing the relations between an input signal and the currents supplied to operate the in-brake, the dimpler and the out-brake.

The wave-shaper 91 is a conventional pulse differentiating circuit for changing the shape of the output current wave of the triode 70 to the curved shape legended "Dimpler Retracks" of Fig. 3C, and may be a differentiating circuit of the type disclosed in the Saunders-Ziffer Patent No. 2,678,965.

The triode 72 is biased by the battery 92 to cut-off. The triode 70 is biased by the battery 93 to cut-off. As previously described, the triode 56 is biased by the battery 59 to conduct except when a positive pulse is applied to its cathode thru the output lead 85 from the multivibrator 84.

*Operation*

Figure 2:
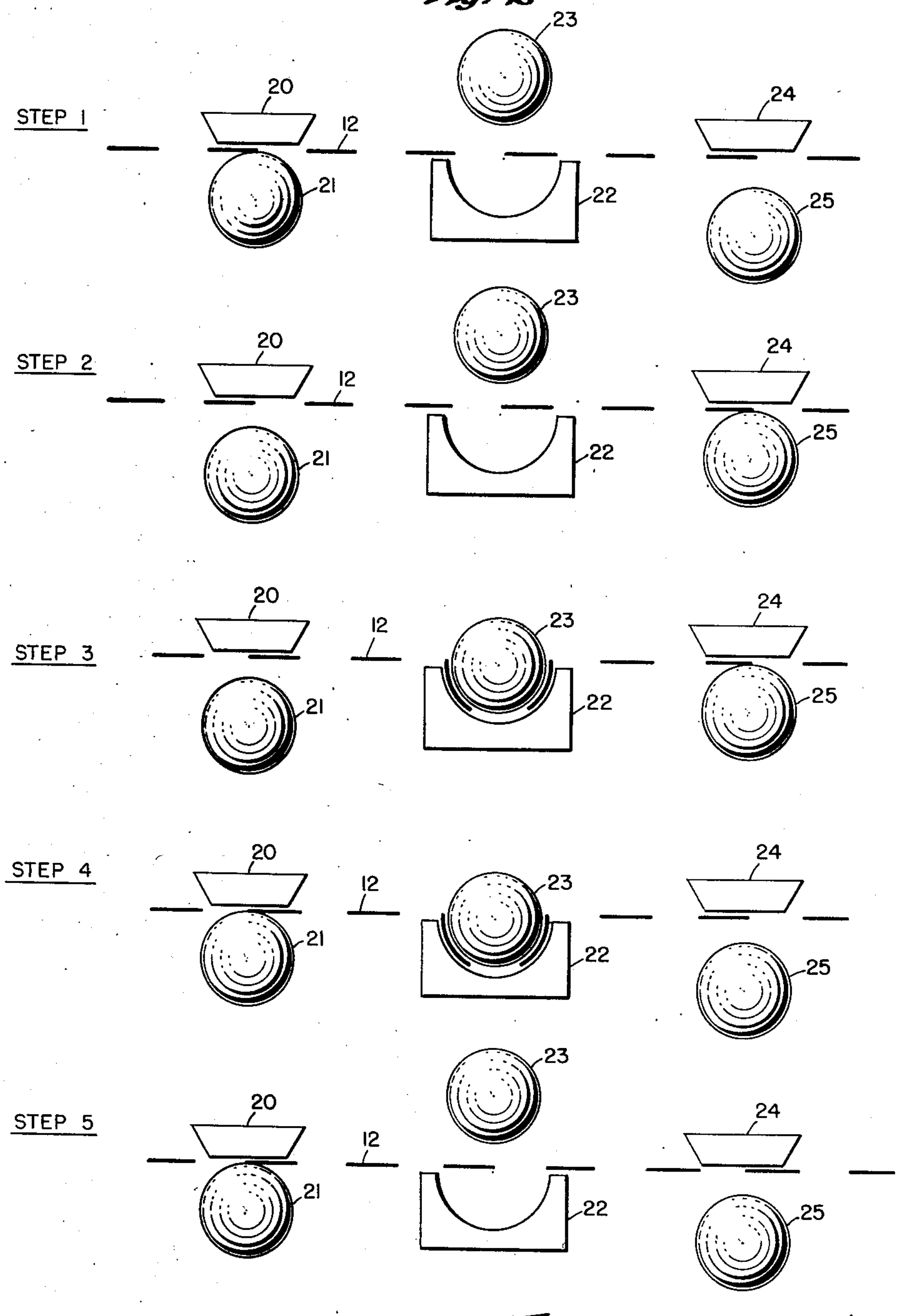
Fig. 2 is a diagrammatic view of the in-brake, dimpler and out-brake of Fig. 1 showing their positions during one cycle of tape-stepping.

Normally, with both motors 11 and 32 operating, the motor 11 acting to hold back the tape slightly, and the motor 32 operating to rotate the reel 31 in take-up direction, when there is no input signal to be recorded, the tape is held stationary by the in-brake, the bar 21 of the in-brake clamping the tape between it and its anvil 20. This braking action is a result of the normal supply of plate current from the triode 56 thru the energizing winding 51 of the in-brake, the triode being normally biased to conduct by the battery 59. Normally, with no input signal to be recorded, the dimpler and out-brake coils are de-energized. This is the condition shown by step 1 of Fig. 2, and to the left of the start line of Fig. 3. At this time the tape is pulled taut.

When an input signal, shown by Fig. 3A, is supplied from the source 83 to the first multivibrator 84, the latter is fired and supplies a positive pulse thru the output lead 86 to the grid of the triode 81, causing the latter to conduct and to supply the plate current shown by Fig. 3D to the energizing winding 77 of the out-brake, causing its bar 25 to move upwardly to press the tape 12 between the bar 25 and the anvil 24.

When the multivibrator 84 is fired it also supplies a positive pulse thru the output lead 85 to the cathode of the triode 56, overcoming the positive bias on its control grid and cutting it off. This results in the current thru the energizing winding 51 of the in-brake being cut off, and in the in-brake bar 25 falling by the action of gravity and the neutral position restoring means, if used, away from the tape, disengaging the in-brake. At this time the dimpler energizing coil is de-energized. This is the condition shown by step 2 of Fig. 2 and by Figs. 3B and 3D.

When the multivibrator 84 fires, it supplies a positive pulse to the second multivibrator 88 causing the latter to fire. The second multivibrator 88 acts as a delay line, and after a short period of time delivers a positive pulse to the third multivibrator 75, causing the latter to fire, and to deliver a first positive pulse thru the output lead 74 and relay 66 to the grid of the triode 72. The relay 66 is energized and pulls down its armatures 65 and 68 against the contacts 71 and 73, respectively, connecting the energizing winding 61 of the dimpler to the plate of the triode and to B+. At the same time the tube 72 is caused by the same pulse to conduct and to supply plate current which flows thru the energizing winding 61 of the dimpler in a direction to cause the dimpler bar 23 to move downwardly into the depression in its anvil 22 carrying the tape with it, as shown by step 3 of Fig. 2.

The current flow thru the dimpler energizing winding is shown by Fig. 3C. Since the in-brake is disengaged and the out-brake is engaged at this time, a section of tape is pulled from the left into the depression in the anvil 22. As can be seen from the dashed lines indicating stepped tape movement on Fig. 2, the amount the tape moves in each step is roughly equal to the increase in the length of path to which the tape is constrained by the action of the dimpler.

Next, the positive pulse supplied by the first multivibrator 84 thru the output lead 86 to fire the triode 81 ends, causing the energizing current thru the winding 77 of the out-brake to cease, and disengaging the out-brake. The positive pulse supplied thru the output lead 85 to cut off the triode 56 ends so that the latter again conducts and causes the in-brake to engage again. The dimpler remains engaged. This is the condition shown by step 4 of Fig. 2. During this portion of the cycle, the tape remains stationary.

Next, the pulse supplied by the third multivibrator 75 thru the relay 66 to the grid of the triode 72 ceases, and the relay is de-energized. Its armatures 65 and 68 are released and strike the contacts 67 and 69 respectively, connecting the plate of the triode 70 to the end of the dimpler winding 61 opposite to that to which the plate of the triode 72 was connected when the relay was energized, and connecting the other end of the winding 61 to B+.

Next, the third multivibrator 75 supplies a positive pulse thru the output lead 90 and wave-shaper 91 to the control grid of the triode 70, causing the latter to conduct and to supply reverse current thru the dimpler energizing winding 61, as shown by Fig. 3C, causing the dimpler bar 23 to be retracted, the wave-shaper 91 causing the dimpler retract current to decrease from its maximum value slowly to zero, and causing the dimpler to disengage slowly for preventing sudden movement of the tape. This is the condition shown by step 5 of Fig. 2. The tape moves to the right under the influence of rightward tension until the slack caused by the action of the dimpler is taken up. During this movement of the tape, the signal delayed in the delay line 95 is recorded.

The system is now ready for the next signal to be recorded. The tape is held stationary by the in-brake until the next signal is received, following which the sequence of events described in the foregoing is repeated.

The anvils of the in-brake and out-brake could have depressions therein as in the case of the anvil of the dimpler.

It will be apparent from the foregoing description that the tape normally is stationary, and that the appearance of a signal to be recorded triggers the electronic driver to step the tape once. Although the input signals may be random in time, they will be recorded in evenly spaced increments along the tape.

During the feeding of the tape, the correct amount of tension on the tape results from the torque delivered by the two motors 11 and 32 and the slack loop mechanisms. In effect, these motors act like magnetically-coupled, slipping clutches in which the slip is closely controlled. The correct amount of this tension is maintained constant thru the action of the tension control arms 15 and 29. Any change in the tape tension due to feed rate variations and tape-stepping accelerations is fed back into the torque motors in such a manner as to oppose the change. If, for instance, the feed rate is suddenly increased, the increased average tension at the input side of the tape is communicated by the action of the weight 38 thru the control arm 15 to the slider of the rheostat 13, which slider is rotated clockwise, increasing the resistance in the supply circuit of the motor 11, and decreasing the torque on the pay-out reel 10. At the same time, the increase in tape speed tends to reduce tape tension in the output side of the feeder. This results in movement of the control arm 29 by the weight 44, causing clockwise rotation of the slider of the rheostat 33, reducing the resistance in the supply circuit of the motor 32, and increasing the torque which it applies to the reel 31. When the feed rate is reduced, the reverse action will take place.

An important feature of the tape-tensioning device is the inertia de-coupling of the tape in the feeder from the relatively large masses of the rest of the feed and take-up mechanism. This function of the mechanism enables the feeder to step the tape accurately at high speeds since only small masses need be accelerated. The control arms 15 and 29 are light in weight and pivot easily so that any tension increase moves the proper control arm so as to momentarily supply an extra portion of tape from the slack loop to the feeder. Simultaneously, all input torques to the pay-out and take-up reels are corrected by the actions of the weights 38 and 44 and the motor controls.

The weights 38 and 44 are isolated from very rapid motions of the control arms by the very soft springs 37 and 43, respectively, which absorb such motions and act as decoupiers. Any tendency of the weights to oscillate is damped out by the damping liquids in the containers 37 and 45 in which the weights are suspended.

While the invention has been described in connection with tape-recording, it could be used for wire-recording. In the annexed claims, the word "tape" is intended to be a generic term which includes wire or equivalents.

While one embodiment of this invention has been described for the purpose of illustration, it should be understood that the invention is not limited to the exact apparatus and arrangement of apparatus illustrated and described, since modifications thereof may be suggested by those skilled in the art, without departure from the essence of the invention.

What is claimed, is:

1. A tape-recording system including a tape upon which signals are to be recorded, comprising a tape play-out reel connected to one end of said tape, a tape take-up reel spaced from said play-out reel and connected to the other end of said tape, means applying torque to said take-up reel continuously in a tape take-up direction, means between said reels for normally braking said tape against movement, means between said braking means and said take-up reel for providing slack in said tape, means actuated by a signal to be recorded for releasing said braking means, for actuating said slack providing means for providing slack in said tape, and for then re-engaging said braking means, and a recorder between said slack-providing means and said take-up reel, said take-up reel pulling the slack in the tape past said recorder.

2. A tape-recording system as claimed in claim 1 in which means is provided for applying torque to said pay-out reel in a direction opposing the pay-out of tape therefrom.

3. A tape-recording system including a tape upon which signals are to be recorded, comprising a tape play-out reel connected to one end of said tape, a tape take-up reel spaced from said play-out reel and attached to the other end of said tape, means for applying torque continuously to said take-up reel in a tape take-up direction, in-brake braking means between said reels for normally braking said tape against movement, dimpler means between said in-brake means and said take-up reel for providing slack in said tape, out-break braking means between said dimpler means and said take-up reel for braking said tape, means actuated by a signal to be recorded for applying said out-brake braking means and releasing said in-brake braking means, for then engaging said dimpler means to provide slack in said tape, for then releasing said out-brake braking means and re-engaging said in-brake braking means, and for then releasing said dimpler means, and a recorder between said out-brake braking means and said take-up reel for recording signals on said tape, said take up reel moving the slack in said tape past said recorder.

4. A tape-recording system as claimed in claim 3 in which means is provided for applying torque to said pay-out reel in a direction opposing the pay-out of tape therefrom.

5. A tape-recording system including a tape upon which signals are to be recorded, comprising a pay-out reel attached to one end of said tape, a take-up reel spaced from said pay-out reel and attached to the other end of said tape, means including a first motor for applying torque to said pay-out reel in a direction opposing the pay-out of tape therefrom, means including a second motor for applying torque to said take-up reel in a direction to take up tape thereon, in-brake braking means between said reels for normally braking said tape against movement, dimpler means between said in-brake braking means and said take-up reel for providing slack in said tape, out-brake braking means between said dimpler means and said take-up reel for braking said tape against movement, means actuated by a signal to be recorded for applying said out-brake braking means and releasing said in-braking means, for then engaging said dimpler means for providing slack in said tape, for then releasing said out-brake braking means and reengaging said in-brake braking means and for then releasing said dimpler means, a recorder between said out-brake braking means and said take-up reel, said take-up reel moving the slack in said tape past said recorder, first tension-responsive means responsive to the tension in the tape between said in-brake braking means and said pay-out reel for decreasing the torque applied by said first motor to said pay-out reel upon an increase in the tension in said tape, second tension-responsive means responsive to the tension in the tape between said recorder and said take-up reel for increasing the torque applied by said second motor to said take-up reel upon a decrease in the tension of said tape.

6. A tape-recording system as claimed in claim 5 in which the first tension-responsive means includes a pivoted control arm having an idler roll thereon over which the tape passes in its path between said pay-out reel and said in-brake braking means, includes a spring attached to said control arm and includes a weight attached to said spring, and in which the second tension responsive means includes a pivoted control arm having an idler roll thereon over which the tape passes in its path between said recorder and said take-up reel, in which the second tension-responsive means includes a spring attached to the last-mentioned control arm and includes a weight attached to the last-mentioned spring.

7. A tape-recording system as claimed in claim 6 in which the first and second responsive means includes impedances in the circuits of the motors which are varied by movements of the control arms.

8. A tape-recording system including a tape upon which signals are to be recorded, comprising a recorder for recording the signals, first electronic means normally energized for holding said tape against movement, second electronic means for providing slack in said tape, and means including means actuated by a signal to be recorded for de-energizing said first electronic means, for energizing said second electronic means, and for moving the slack in the tape past said recorder.

9. A tape-recording system as claimed in claim 8 in which means including time delay means is provided for supplying the signal to the recorder.

10. A tape-recording system as claimed in claim 9 in which the first electronic means includes a first multivibrator fired by the signal, in which the second electronic means includes a second multivibrator, and in which means is provided for firing the second multivibrator a predetermined time after the first multivibrator is fired.

11. A tape-recording system as claimed in claim 8 in which the first electronic means includes a first multivibrator fired by the signal, in which the second electronic means includes a second multivibrator, and in which means is provided for firing the second multivibrator a predetermined time after the first multivibrator is fired.

12. A tape-recording system including a tape upon which signals are to be recorded, comprising an electronic in-brake normally energized for holding said tape against movement, an electronic dimpler for providing slack in said tape, a recorder, means for pulling the slack in the tape past said recorder, an electronic out-brake for preventing the slack in the tape being moved past said recorder, and means including means actuated by a signal to be recorded for de-energizing said in-brake and energizing said out-brake, for then energizing and de-energizing said dimpler, and for then energizing said in-brake and de-energizing said out-brake.

13. A tape-recording system as claimed in claim 12 in which means is provided for supplying the signal to the recorder following the energization of said in-brake and the de-energization of the out-brake.

14. A tape-recording system as claimed in claim 13 in which the means actuated by the signal includes a first multivibrator fired by the signal and which first de-energizes the in-brake and energizes the out-brake, and after a predetermined time interval re-energizes the in-brake and de-energizes the out-brake, includes a second multivibrator which energizes and de-energizes said dimpler during said time interval, and in which means is provided for firing the second multivibrator after the first multivibrator is fired.

15. A tape-recording system as claimed in claim 12 in which the means actuated by the signal includes a first multivibrator fired by the signal and which first de-energizes the in-brake and energizes the out-brake and after a predetermined time interval re-energizes the in-brake and de-energizes the out-brake, includes a second multivibrator which energizes and de-energizes said dimpler during said time interval, and in which means is provided for firing the second multivibrator after the first multivibrator is fired.

16. A tape-recording system as claimed in claim 15 in which the last-mentioned means includes another multivibrator which is fired by the first multivibrator.

References Cited in the file of this patent

UNITED STATES PATENTS

| | | |
|---|---|---|
| 1,941,597 | Covagnaro | Jan. 2, 1934 |
| 2,004,893 | Hall | June 11, 1935 |
| 2,286,072 | Dudley | June 9, 1942 |
| 2,365,691 | Fodor | Dec. 26, 1944 |
| 2,396,409 | Berger | Mar. 12, 1946 |
| 2,431,646 | Kenney | Nov. 25, 1947 |
| 2,521,623 | Arndt | Sept. 5, 1950 |
| 2,553,410 | Handschin | May 15, 1951 |